UNITED STATES PATENT OFFICE.

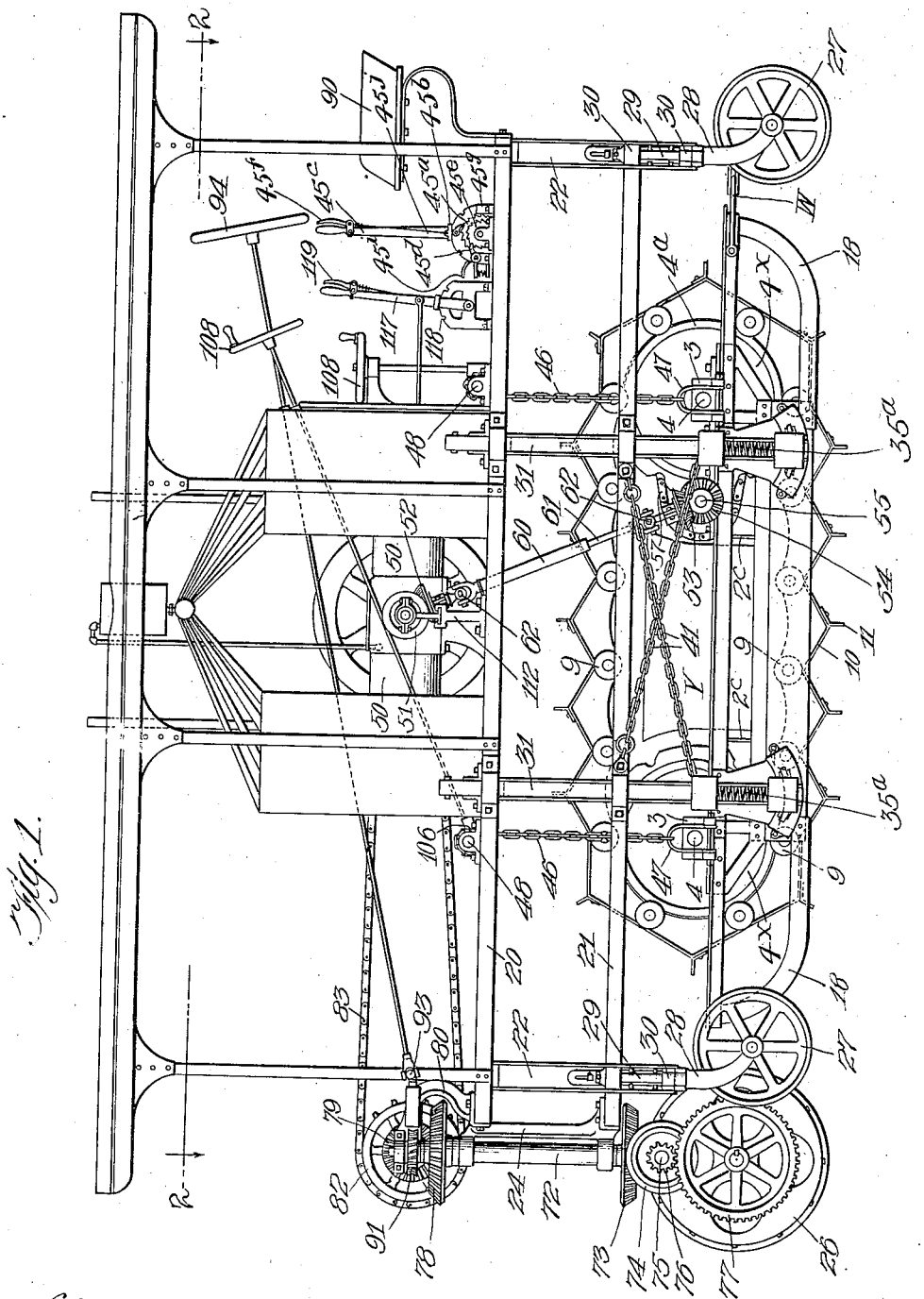

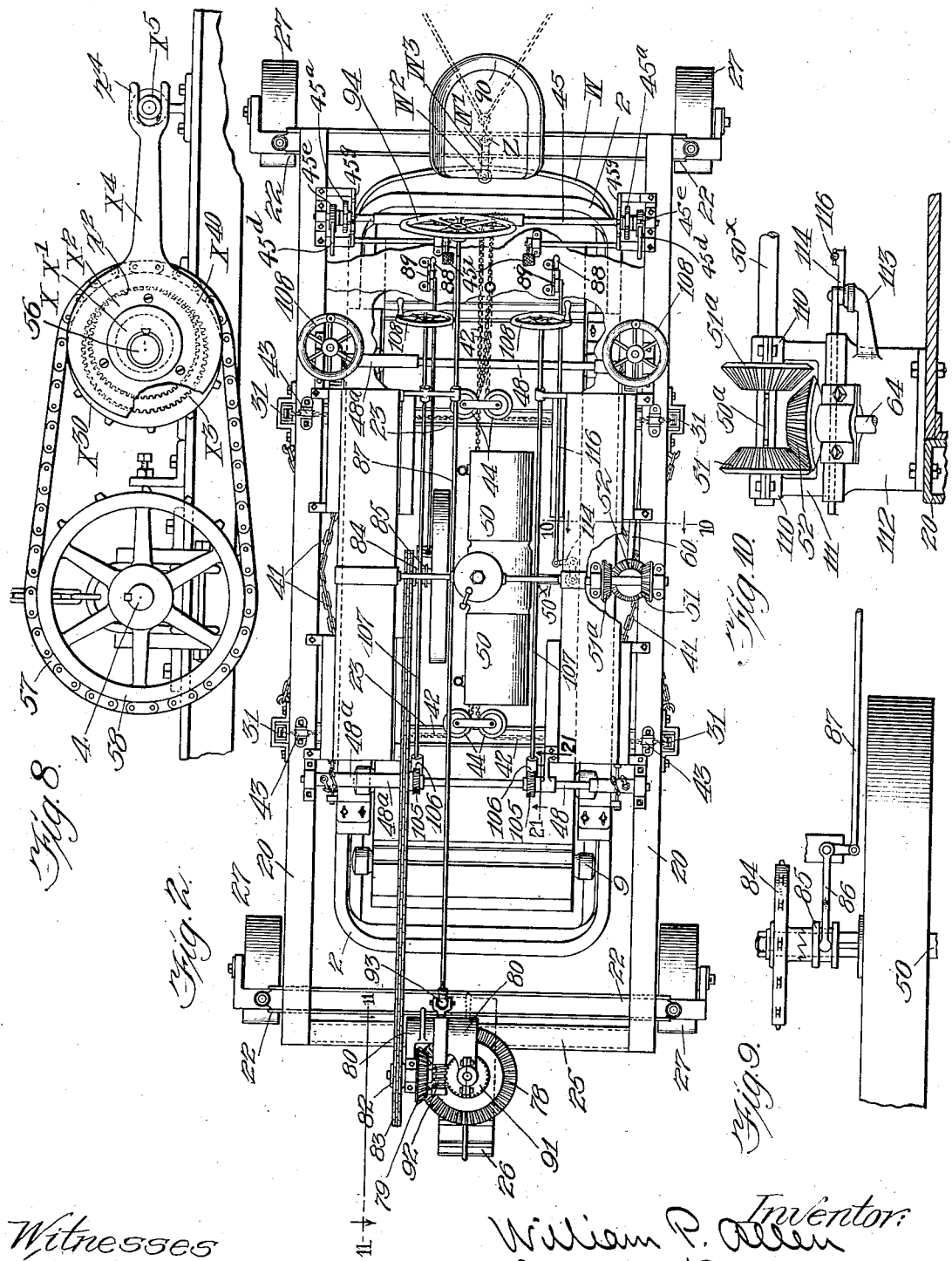

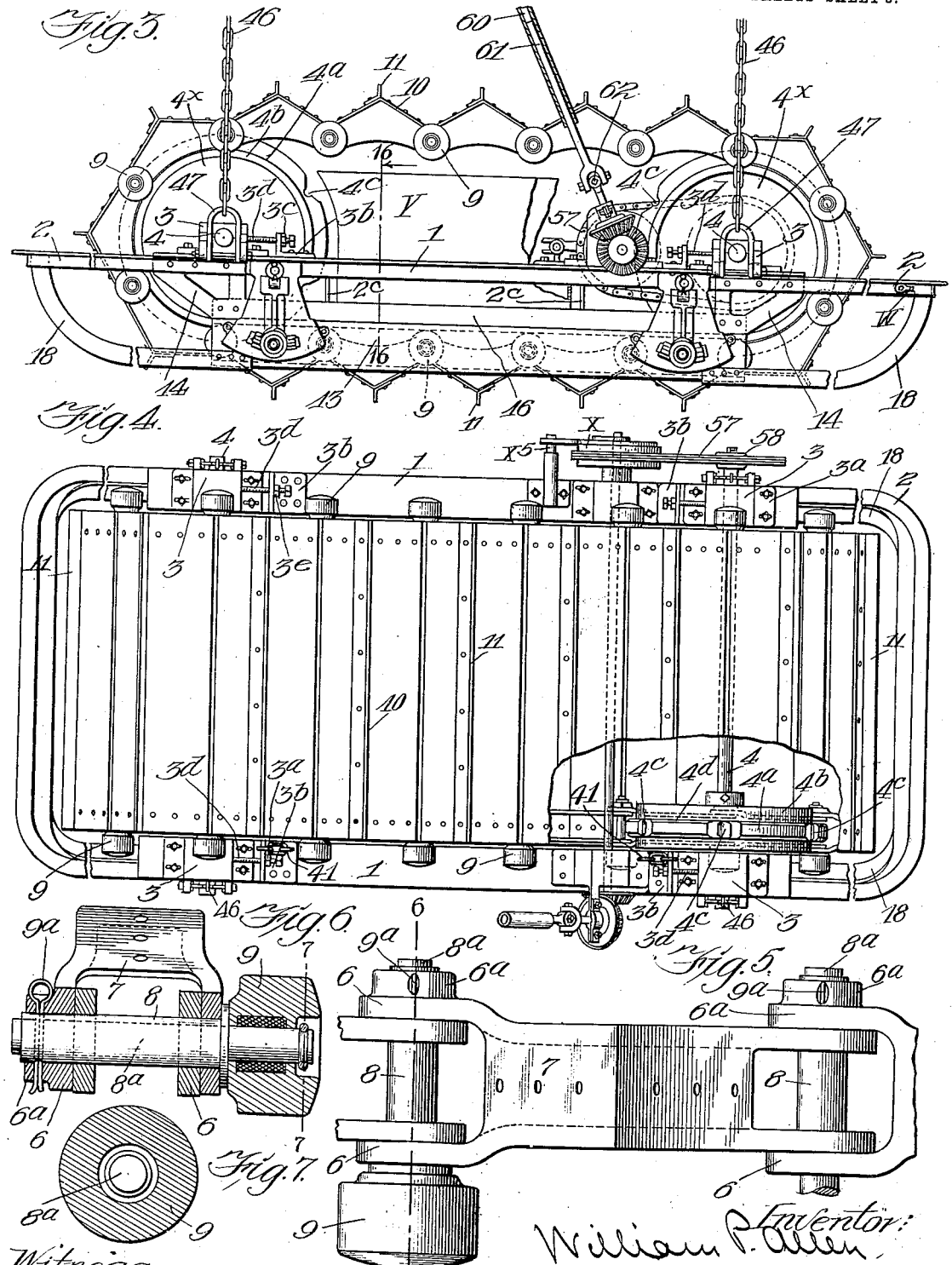

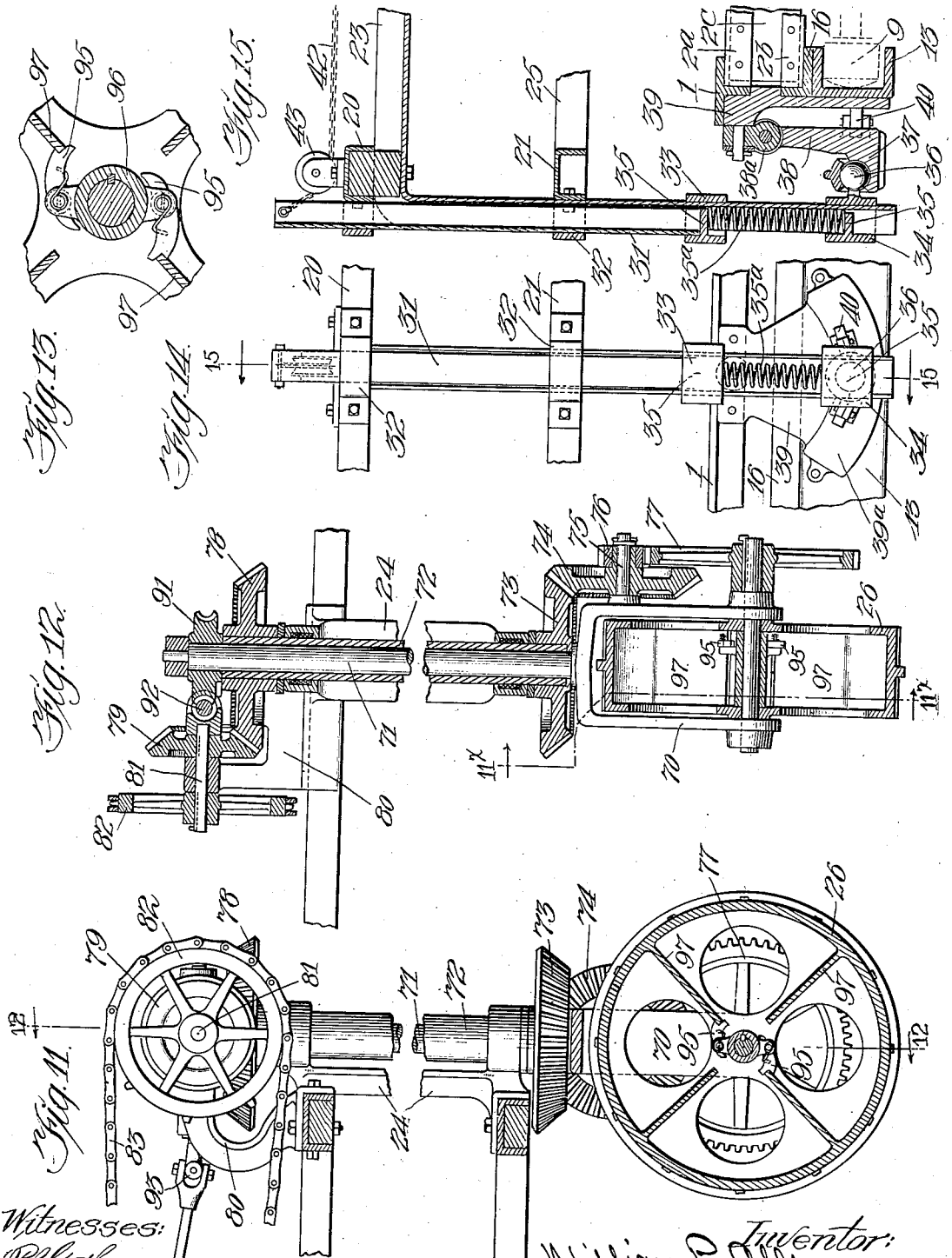

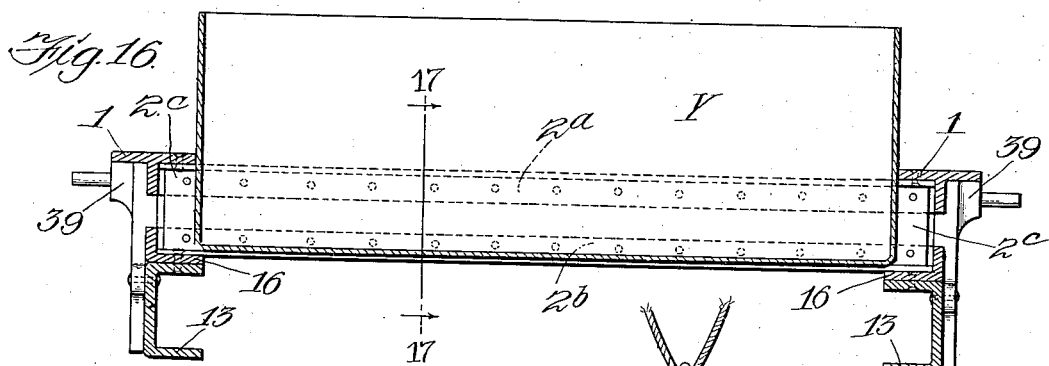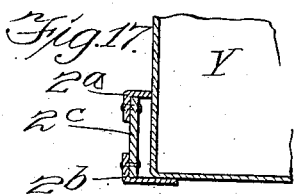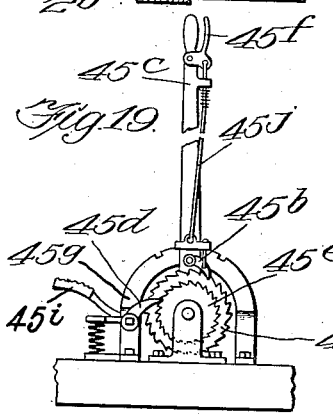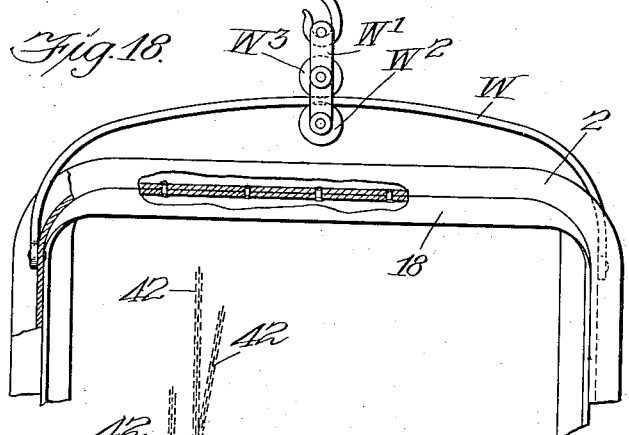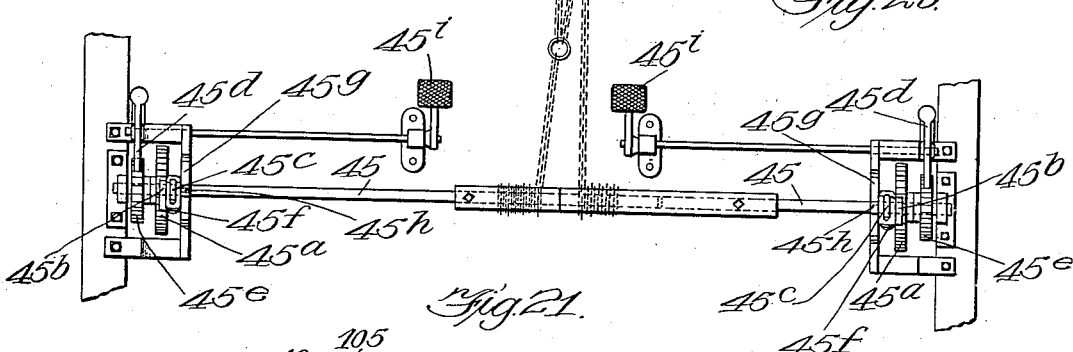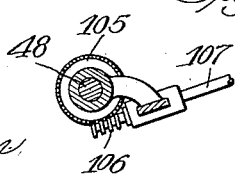

WILLIAM P. ALLEN, OF CHICAGO, ILLINOIS.

TRACTOR.

1,057,991.  Specification of Letters Patent.  Patented Apr. 1, 1913.

Application filed January 31, 1910. Serial No. 541,087.

*To all whom it may concern:*

Be it known that I, WILLIAM P. ALLEN, a citizen of the United States, residing at Chicago, in the county of Cook and State of Illinois, have invented new and useful Improvements in Tractors, of which the following is a specification, reference being had to the accompanying drawings, forming a part thereof.

The purpose of this invention is to provide an improved construction of a tractor, the improvements being designed to increase the drawing power relatively to the weight of the structure.

It consists in the elements and features of construction and their combinations shown and described as indicated in the claims.

In the drawings:—Figure 1 is a side elevation of a structure comprising a tractor and vehicle for the same embodying this invention. Fig. 2 is a plan view of the same with the canopy top partly broken away to disclose the structure below. Fig. 3 is a side elevation of a tractor detached from the vehicle. Fig. 4 is a plan view of such tractor. Fig. 5 is a detail plan of a link of the tractor chain and adjacent parts of adjoining links. Fig. 6 is a section at the line 6—6 on Fig. 5. Fig. 7 is a section at the line 7—7 on Fig. 6. Fig. 8 is a side elevation of a speed-reducing device by which power is transmitted to the drive axle of the tractor. Fig. 9 is a detail plan view of the motor, fly wheel and initial sprocket wheel and a clutch connecting them. Fig. 10 is a detail section at the line 10—10 on Fig. 2. Fig. 11 is a partly sectional side elevation of a steering wheel and its driving and operating connections broken away at the middle part to condense the view vertically, section being made as to the upper part at the line 11—11 on Fig. 2, and as to the lower part at the line 11$^x$—11$^x$ on Fig. 12. Fig. 12 is a section at the line 12—12 on Fig. 11. Fig. 13 is a detail section of a ratchet-drive connection of the steering wheel at the plane indicated by the line 11$^x$—11$^x$ on Fig. 12, and on a larger scale than the similar section on Fig. 11. Fig. 14 is a detail side elevation of a vertical guiding device for the tractor in its adjustment on the vehicle. Fig. 15 is a section at the line 15—15 on Fig. 14. Fig. 16 is a vertical transverse section of the tractor frame and a box thereon, at the line 16—16 on Fig. 3. Fig. 17 is a section at the line 17—17 on Fig. 16. Fig. 18 is a detail plan view of a draft connection provided at the rear end of the tractor frame. Fig. 19 is a detail side elevation of operating lever and pawl-and-ratchet connection for operating the means for raising and lowering the tractor. Fig. 20 is a detail plan view of said raising and lowering devices. Fig. 21 is a detail section at the line 21—21 on Fig. 2.

The tractor element of this structure independently of the vehicle with which it is connected and which in the structure shown in the drawings carries the motor, will be first described. It comprises the horizontal axle-bearing frame consisting of two longitudinal beams, 1, 1, T-form in cross section, as seen in Fig. 15, which are rigidly joined by front and rear yokes, 2, 2, which extend respectively forward and rearward around the tractor which is mounted between the longitudinal beams, 1. Upon said longitudinal beams are mounted axle boxes, 3, in which are journaled tractor axles, 4. On each axle, near the bearings in the axle boxes, there are mounted rigidly two chain-engaging wheels, 4$^x$, the right-hand and left-hand wheels on the two axles being respectively alined fore-and-aft for connection by the tractor chains about to be described. The chain-engaging wheels each comprise a radial flange, 4$^a$, and laterally projecting annular flanges, 4$^b$, at opposite sides of the radial flange; said radial flange is provided with notches, 4$^c$, for engaging the chain pintles, as hereinafter more particularly described. The structure of the links of the tractor chain may be understood from Figs. 5 and 6. Each link comprises two parallel webs, 6, 6, connected by a transverse web, 7, forming a saddle adapted to stride the flange, 4$^a$, of the chain-engaging wheel. The inner edges of the flanges, 6, are curved to conform to and seat on the annular flanges, 4$^b$, of the wheel. At the outer side, the links are V-shaped preferably with a wide angle (as illustrated, 120 degrees), this being the form in section transverse to the axis of the wheel of the web, 7.

The lateral webs or flanges, 6, of the link extend longitudinally beyond the web, 7, as seen in Fig. 5, and at one end they are spread widely enough to admit between them the other end of the link, and the corresponding end of the next adjacent link is thus entered, and the two are connected together by a hollow pintle or sleeve, 8, taking through the four terminals thus assembled. A bolt, 8ª, extends through the hollow pintle and projects beyond the link at one side, being the outer side when it is mounted on the wheel, and on said projecting end carries an antifriction roller, 9. The link has an annular boss, 6ª, projecting around the pintle at the side opposite that at which the roller is mounted, and a cotter pin, 9ª, inserted through this boss and through the pintle and the bolt, 8ª, stops both said pintle and bolt against rotating in the link. The two wheels, 4ˣ, upon each axle are mounted thereon with their chain-engaging notches, 4ᶜ, alined transversely with the wheels,—that is, parallel with the axle,—so that the two chains have their respective links directly opposite each other throughout their entire extent around both wheels; and these opposite links are rigidly joined together by metal plates, 10, bolted on to the outer sloping surfaces of the V-shaped webs, 7, as clearly seen in Fig. 3; and there is further applied to each pair of links thus joined an angle plate, 11, having one flange bolted on outside of one of the plates, 10, and its other flange projecting from the angle of the web or meeting line of the two plates in a plane substantially bisecting such angle. This mode of construction results in a tractor apron whose width is substantially the entire distance between the side bars of the frame and which has a ground engagement whose area is that width multiplied by the longitudinal distance from axle to axle; and such ground engagement is rendered most efficient for all varieties of track upon which the device may be operating by the ribs formed by the projecting flange of the angle plates, 11, which will engage comparatively hard soil sufficiently to prevent slipping, and by the wide angular alternating recesses and projections or V-shaped ribs and channels formed by the plates, 10, constituting the apron members, said angular form having the effect to compact the earth between the sloping faces and prevent it from being plowed by the device; that is, preventing the tracker apron from slipping so easily as it would if the earth were cut up into narrower sections by the engaging features of the apron or by the usual projecting ribs of the tractor wheel. In order, however, that the full value of the extended area of engagement of the tractor with the earth may be available and operative for traction, it is necessary that the lower ply of the tractor apron between the wheels be prevented from bowing up, and shall, on the contrary, be held positively in straight line from tangent point to tangent point on the wheels, and it is for this purpose that the rollers, 9, are provided on the chain spindles. For cooperating with these rollers there is provided at each side a channel bar, 13, (the form being most clearly seen in Fig. 15) which is rigidly suspended by brackets, 14, from the longitudinal beam, 1, the channel being located in the path of the rollers, 9, from wheel to wheel; that is, so that the center of the channel is tangent to the path about the wheel of the axes of the chain pintles and rollers. The channels are wide enough to permit the rollers to travel freely in them, so that they are in contact with and roll on the upper flange when the weight is carried without jolting, and upon the lower flange in case of any rocking or jolting or dragging of the apron operating to produce distortion at any particular point.

Considering the structure thus described, it will be observed that the lower ply of the tracker apron engaged with the earth or roadway is fixed in position, and that the movement of travel which occurs is a movement of the frame and load carried by the tractor on the rollers, 9, with which the channel bars, 13, are engaged and to which the entire load is transmitted by such channel bars. The operation is therefore similar to that of moving a log on rollers mounted in fixed bearings in a chute or run-way, and the employment of the rollers insure the performance of the work with the minimum loss by friction in this travel. It will be further observed that the connection of the opposite links of the two tractor chains rigidly by the apron plates, 10, operates to prevent any tipping of the chains which would cause cramping of the rollers in their track along the channel bars, and also operates to prevent the turning of the rollers horizontally out of their true direct transverse position, and that this rigid connection therefore, tends greatly to reduce the friction of travel.

In view of the fact that the channel bars, as above stated, carry the entire load, they are reinforced by angle bars, 16, (see Fig. 15) having the horizontal flange lodged upon the upper horizontal flanges of the channel bar and the vertical flange bolted to the brackets, 14. Further to reinforce the channel bars and hold them very rigidly in their proper position with respect to the frame, and especially to prevent their longitudinal displacement, and further as a means of facilitating the advance of the tractor over uneven ground, curved braces, 18, of sled runner form are rigidly bolted to the ends of the channel bars and extend longitudinally therefrom, being curved upwardly to the front and rear bows, 2, 2, respectively.

To render the tractor frame especially rigid, as is desirable, in addition to the end bows, 2, 2, for connecting the longitudinal side bars, said side bars are connected by transverse angle bars, 2ª, 2ª and 2ᵇ, 2ᵇ, the angle bars, 2ª, having their horizontal flanges at the upper side lodged under the inner flange of the T side bars and bolted thereto, and the lower angle bars, 2ᵇ, having their horizontal flanges at the lower side lodged upon the upper surface of the horizontal flange of the reinforcing angle bars, 16, and bolted thereto, the vertical webs of the angle bars, 2ª and 2ᵇ, being in the same vertical plane and connected together by a plate, 2ᶜ, bolted to said vertical angle bars. There are thus formed two very rigid cross ties, each comprising an angle bar, 2ª, an angle bar, 2ᵇ, and a vertical plate, 2ᶜ, connecting their vertical webs, said cross ties being located between the tractor wheels and as near to them respectively as convenient. And for further reinforcing the frame for rigidity in all directions and for an additional purpose hereinafter mentioned, there is provided a rectangular metal box, Y, which is of such exterior dimensions as to permit it to be entered and to fit snugly between the proximate edges of the horizontal flanges of the upper angle bars, 2ª, and between the proximate edges of the horizontal flanges of the lower angle bars, 2ᵇ, being made wider than the horizontal flanges of the bars, 2ª, afford lodgment and support for the box. This box is designed, in addition to serving the purpose of horizontal bracing for the frame, to hold material with which it may be loaded for weighting the tractor in any case in which such additional weight may be desirable for increasing the traction.

In order to provide means for taking up any slack which may arise in the tractor apron, the axle boxes, 3, are mounted for sliding longitudinally on the longitudinal side bars, 1, by being formed for engaging the upper flanges of the T-shaped side bars, 1, and brackets, 3ᵇ, are fixedly mounted on the side bars at the inner side of the axle boxes and provided with an adjusting screw, 3ᵈ, screwed through the upstanding lip of the bracket and impinging against the axle box for crowding the latter away from the bracket, a jam nut, 3ᵉ, being provided on the adjusting bolt to hold the parts as adjusted.

The tractor is provided with means for connecting it to any machine or load which it is to draw, said means consisting of a bowed or transversely curved draft bar, W, which is fast at its ends to the rear bow, 2. A clevis, W¹, is engaged with this bow, the engagement being made by two rollers, W², W³, mounted between the bars of the clevis and traveling one in front of and the other behind the bow, the draft devices represented by the hook, Z, being designed to be engaged with the yoke of the clevis. The curved form of the draft bar is adopted for the purpose of causing the point of draft to shift according to the direction of draft so that if the travel is directly forward and the load is following directly in the track of the tractor, the clevis will seat itself at the middle of the bow, but in case of deflection of the course of travel so that the resistance of the load to advance is in a line oblique to the line of advance, the clevis will shift its position on the bow toward which the tractor is turning. The curvature of the bow is preferably approximately about a vertical axis midway between the tractor axles, but considerable variation from such a radius of curvature will not materially affect the action or prevent it from being as desired.

The tractor element above described is shown mounted in or having mounted upon it a carriage or vehicle which has chiefly the purpose of carrying a steering wheel and motor, the connections between the carriage and tractor being designed with a view to either lifting the tractor wholly from the ground, causing it to be carried entirely upon the vehicle, or lifting it at either end or either side, at the will of the operator, to cause it to engage the ground either at one side or at one end or at one corner, while the weight is otherwise carried upon the wheels of the vehicle, including the steering wheel and the caster wheels hereinafter mentioned. This carriage comprises two horizontal frames, 20 and 21, of the same dimensions, positioned with their corresponding side and end bars, respectively, one above the other. These two horizontal frames are rigidly connected to each other by inverted U-shaped members, 22, 22 and 23, 23, of which there are four, each formed of a channel bar having its end portions bent at right angles to its length, flanges outward. The cross bar or middle portion of each of these yokes extends under the longitudinal side bars of the upper frame, 20, and is rigidly secured thereto. The vertical limbs of each yoke extend down outside the longitudinal side bars of the lower frame, 21, and are secured thereto. In addition to the transverse connections between the longitudinal side bars which are afforded by the middle horizontal portions of these four vertical members, said longitudinal bars of each frame are connected by transverse bars, 25, 25, at the forward end, and on these transverse bars there is mounted a bracket, 24, which carries the driving and controlling gears for a steering and traction wheel 26. Said wheel and its driving and operating connections will be hereinafter more particularly described. At the lower end of each of the vertical limbs of the two end members, 22, there is mounted a caster wheel, 27, having its bearing arm, 28, provided with a spindle, 29, for which suitable bearings, 30, are secured adjustably in the channel of said channel bar limbs. The vertical limbs of the intermediate frame members, 23, 23, are utilized as guides for cushion posts, 31, which are made of channel bar with their side flanges adapted to be entered between the flanges of said channel bar limbs so that they may be said to telescope with the latter, the two channel bars being engaged channel to channel so as to inclose between them a rectangular space into which the bolts which secure said vertical limb to the longitudinal bars of the frame, 21, are accommodated. Clasps or guide boxes, 32, are bolted to the outer side of said longitudinal bars striding the two telescoped channel bars and retaining them together. At the lower end of the posts, there is provided a cushioning device which comprises two rectangular sleeves, 33 and 34, each having a web, 35, projecting from one side into the rectangular opening, stopping short of the three other sides enough to allow space for the web and flanges of the channel-bar limbs, and a coiled spring, $35^a$, is interposed between these two webs. The lower of the two sleeves has a spherical knob, 36, projecting from its rear side, which forms the ball or inner member of a ball-and-socket joint, whose outer member, 37, is formed on the outer side and lower end of a bracket, 38, which is suspended from a fixed bracket, 39, rigid with the tractor frame. The connection of the bracket, 38, with the bracket, 39, is substantially a universal joint, said bracket having a short link, $38^a$, at its upper end, the lower member or main body of the bracket being pivoted to the said link for swinging laterally with respect to the tractor, and the said link being pivoted to the bracket, 39, for swinging fore-and-aft. The bracket, 38, has at its lower end anti-friction rolls, 40, 40, at the inner side bearing against the segmental track, $39^a$, which is formed on the outer face of the bracket, 39. This connection, it will be observed, permits longitudinal swinging of the brackets, 38, while bearing against the bracket, 39, to accommodate the movement of the vehicle or carriage with respect to the tractor. For checking the fore-and-aft movement, which is accommodated, as described, by the capacity of the brackets, 38, for swinging fore-and-aft, stay chains, 41, are connected to the lower longitudinal bars, 21, of the carriage and to the tractor frame or rigid projection therefrom near the axle boxes, as the brackets, $3^b$, two chains upon each side being thus provided and crossed, as seen in Fig. 1.

The cushion posts described are adapted to carry the carriage structure comprising the longitudinal frames, 20, and their connecting members by means of flexible connections, as chains, 42, connected to the upper end of the posts (see Fig. 15), and extending thence down under vertical guide pulleys, 43; thence around horizontal guide pulleys, 44; thence rearward to a windlass shaft, 45, which is provided with means for rotating it to wind up the chains, as hereinafter described. When the chains are so wound up on the windlass shaft sufficiently to lift the caster wheels and steering and traction wheel of the carriage off the ground, leaving the whole load resting upon the tractor, the weight of said carriage and machinery thereon will be carried upon the four springs, $35^a$.

In order to lift the tractor and cause the entire weight to be carried upon the wheels of the carriage, chains, 46, are connected by bails or lifting loops, 47, to the four axle boxes, 3, and extend thence up to windlass shafts, 48 and $48^a$, about which the chains may be wound by connections hereinafter described. When the tractor is thus lifted off the ground, the carriage normally rests upon the rear caster wheels and the forward traction and steering wheel, but may be carried in part by the forward caster wheels if uneven ground causes lateral rocking or the traction wheel drops into a furrow or rut.

It is designed to mount upon the carriage a motor for propelling the tractor and carriage, and such motor is represented by conventional outlines of a gasolene engine, 50, which is shown housed on a platform supported on the upper frame, 20. Power is represented as communicated from the bevel gears, 51 or $51^a$, on the motor shaft meshing with a bevel gear, 52, on the upper end of a shaft which extends obliquely down rearward and carries at its lower end a bevel gear, 53, meshing with a bevel gear, 54, on one end of a horizontal shaft, 55, which is journaled on the tractor frame extending through the tractor apron, and having at its opposite end a speed-reducing device, X (of familiar construction but more particularly hereinafter described). From its outer element, power is communicated by a chain, 57, to a sprocket wheel, 58, preferably on the rear axle of the tractor. In order to accommodate the adjustments of the tractor and carriage and avoid cramping in its bearings, the shaft which communicates power from the gear, 52, to the gear, 53, comprises two telescoping members, 60 and 61, which are connected respectively by universal joints, 62, 62, with the stub shafts, 64, 64, of the gears, 52 and 53, respectively. The speed-reducing device, X, is of the well-known type, comprising an eccentric, $X^1$, on the shaft, 56, encompassed by the ring or eccentric band, $X^2$, which has an annular gear toothed on its outer periphery at $x^2$, for engagement with the internal gear element, $X^3$, having a larger number of teeth than said annular gear or eccentric band. A controlling arm, $X^4$, is extended into a plate, $X^{40}$, for securement to the face of the annular gear, $X^2$, and for covering the interval between said gear and the internal gear, $X^3$. Said controlling arm is extended to a point preferably quite distant from the axis of the shaft, 56, and at such distant point is provided with a pivotal slide bearing by means of its forked end, $x^4$, engaging a pivot stud and roll, $X^5$. It will be understood that in accordance with the law of this device, each rotation of the shaft, 56, produces so much of a rotation of the outer member of the reducing device, the internal gear, $X^3$, as the difference between the number of teeth of the two gears, $X^2$ and $X^3$. In the drawings, this difference is represented as one-tenth of the number of teeth of the outer gear, causing a reduction of speed from ten to one of the device. The said member, $X^3$, is exteriorly formed as a sprocket wheel, its sprocket rim, $X^{30}$, having a pitch line diameter less than that of the sprocket wheel, 58, on the tractor axle, and a further reduction of speed is thereby effected. The steering wheel, 26, formed also as a traction wheel, is journaled in the fork, 70, whose spindle, 71, extends up through a sleeve or tubular shaft, 72, which is journaled vertically in the bracket, 24. Said sleeve or tubular shaft at its lower end above the fork head carries rigidly a bevel gear, 73, which meshes with a bevel gear, 74, journaled on a stud axle, 75, which projects from the fork, 70. A spur pinion, 76, rigid with the bevel gear, 74, meshes with a spur gear, 77, which is rigid with the steering wheel axle and constitutes the means of rotating it as a traction wheel when so desired. For driving the train of gears thus described to thus operate the wheel, 26, as a traction wheel, there is rigid with the upper end of the sleeve or tubular shaft, 72, a bevel gear, 78, which meshes with a bevel gear, 79, journaled in the bracket, 80, which is formed as a rigid arm of the bracket, 24, being fast on its shaft, 81, on which there is also fast a sprocket wheel, 82, driven by a chain, 83, from a sprocket wheel, 84, on the opposite end of the motor shaft from that which carries the bevel gear, 51 and $51^a$, for transmitting power to the tractor. Said sprocket wheel, 84, is connected with the motor shaft by a clutch, 85, operated by a shipping lever, 86, which is one arm of a bell-crank lever, whose other arm is connected by an operating link, 87, with the operating lever, 88, mounted for swinging over a segment, 89, within reach of the driver occupying the seat, 90. For operating the wheel, 26, as a steering wheel, its spindle is provided at the upper end above the wheel, 78,—that is, at the upper end of the sleeve or tubular shaft, 72,—with a worm gear, 91, which is actuated by a worm, 92, journaled in the bracket arm, 80, and having its shaft connected by a universal joint, 93, with an operating handle wheel, 94, which is mounted in convenient position to be reached by the driver on the seat, 90.

The wheel, 26, is designed to be used as a tractor wheel in turning the machine or for reversing, and may be geared to a slower circumferential speed than the tractor; and in order that it may perform its function of steering by propelling the forward end of the machine in the direction in which said wheel may be set without operating to resist the propelling action of the tractor which may be engaged at the same time said steering wheel is engaged with its shaft by pawls, 95, 95, pivoted on a collar, 96, keyed to the shaft and engaged with the ratchet teeth formed with the internal ends of the reinforcing ribs, 97, of the web of said wheel, as seen in Figs. 11 and 13.

The windlass shaft, 45, is formed in two members, one mounted as a sleeve upon the other, and for operating each of these windlass shafts to wind up the chain extending thereto and lift the vehicle frame at the two sides respectively, there is rigid with each of said members a ratchet wheel, $45^a$, which is engaged by a pawl, $45^b$, carried by an operating lever handle, $45^c$, mounted for rocking upon the shaft, a detent pawl, $45^d$, being suitably fulcrumed for engaging a ratchet disk $45^e$, also rigid with the shaft. In order to facilitate unwinding the chain from the windlass to lower the vehicle frame, the detent pawl, $45^d$, has a foot lever, $45^f$, by which it may be released, while the operator holding the handle lever, $45^c$, permits the shaft to rock in direction for unwinding the chain, the foot being lifted and the detent pawl allowed to reëngage the ratchet disk, $45^a$, at the limit of a convenient swinging movement of the handle lever, the operator by means of the thumb lever, $45^f$, releasing the pawl, $45^b$, to permit the lever to be rocked back to a new starting point if the vehicle frame is to be lowered more than can be done by one convenient swing of the lever. In order to further facilitate the action and to cause the descent of the vehicle frame to be checked without throwing the lever entirely out of reach of the operator in case it should be let go while the detent $45^d$, is out of engagement with the ratchet disk, $45^a$, there may be provided a notched segment, $45^g$, fixed in position on the frame with which a detent dog, $45^h$, which is also operated by the thumb piece, $45^i$, and its connecting rod, $45^j$, may engage.

In order to lift separately each of the axles on the tractor when it is to be elevated with respect to the carriage, each windlass shaft, 48, has mounted on it a tubular windlass shaft, $48^a$, and each of said windlass shafts is provided with a worm wheel, 105, meshing with a worm, 106, on a shaft, 107, which extends to an operating handle wheel, 108, within reach of the driver on the seat, 90. The shafts, 107, which operate the forward windlasses, 48 and 48ª, necessarily extend obliquely upward and rearward to the other operating handles, while the shafts which operate the rear windlasses, 48 and 48ª, are shown extending vertically to their operating handles.

In order that the operator may from the driver's seat control the connection of the motor with the tractor to give it forward or reverse movement or leave it entirely disconnected, there are provided the two equal bevel gears, 51 and 51ª, above mentioned, both mounted for sliding on the motor shaft, 50ˣ, and engaged therewith by a feather, 50ª. Both of said gear wheels have their hubs extended into bearings, 110, on the arms of a bracket, 111, which is mounted for sliding transversely in the bracket, 112, on one of the longitudinal side bars of the frame, 20. The two bevel gears, 51 and 51ª, facing in opposite directions,—that is, toward each other,—are spaced apart so that they may engage, one at a time, the bevel gears, 52, on the upper end of the oblique shaft, 60—61; and for sliding the bracket, 111, so as to carry one or the other of said gears, 51 and 51ª, into mesh with the gear, 52, for forward or rear driving, or to position said bracket so that both the gears, 51 and 51ª, are out of mesh with the gear, 52, there is fulcrumed on a bracket arm, 113, projecting from the standard, 112, a bell-crank lever, 114, having one of its arms pivotally connected with the slide bracket, 111, and having the other arm connected to an operating connecting rod, 116, which extends rearward toward the driver's seat and is connected to a hand lever, 117, fulcrumed so as to be within reach of the driver and swinging past a segment, 118, with which it is engaged by a detent controlled by a thumb lever, 119.

I claim:—

1. In combination with an endless belt tractor, a carriage or vehicle for the same, the tractor frame being mounted for vertical adjustment bodily at both ends and both sides with respect to the vehicle frame, and means for so adjusting it at the opposite sides independently of each other.

2. In combination with a tractor, a carrying structure for the same comprising axles and carrying wheels thereon, the tractor comprising wheels and axles for the same, and an endless apron encompassing the wheels; structures connecting the carrying structure with the tractor axles for supporting said carrying structure on said tractor axles, and means for raising and lowering the tractor axles with respect to the carrying structure axles.

3. In combination with an endless belt tractor, a vehicle or carriage for the same having wheels by which it is supported independently of the tractor, adjustable means for suspending the tractor frame from the carriage frame, adjustable means for suspending the carriage frame from the tractor frame, and means mounted on the carriage frame for operating on said adjustable connections to raise and lower said frames relatively to each other at will.

4. An endless belt tractor having a plurality of auxiliary supporting wheels, flexible and adjustable connections between said auxiliary wheels and the tractor, adapted to permit a limited vertical adjustment of the tractor at each side and at each end with respect to said wheels, means for selectively effecting any one of said adjustments or any combination of them in unison, and means for propelling and guiding the tractor.

5. In combination with a tractor, a vehicle or carriage for the same having wheels by which it is supported independently of the tractor; flexible means for suspending the tractor frame from the carriage frame; flexible means for suspending the carriage frame from the tractor frame, and means mounted on the carriage frame for operating on said flexible connections to raise and lower said frames relatively to each other at will.

6. In combination with an endless tractor, a carrying structure for the same and wheels thereon comprising a steering wheel at one end; means by which the tractor structure and the carrying structure are connected for carrying either upon the other, and means for raising and lowering the wheels of the carrying structure relatively to the tractor structure to shift the support from the one to the other.

7. In combination with a self-supporting endless belt tractor, a self-supporting vehicle for the same; connections between the tractor frame and the vehicle frame for supporting either wholly upon the other; means for vertically adjusting said frames relatively to each other to cause either to carry the other bodily; a motor mounted upon one of said frames; a steering wheel mounted upon one of said frames; driving connections from the motor to the tractor, and means for operating the steering wheel for steering.

8. In combination with a tractor, a carriage or vehicle for the same having wheels with which it is supported independently of the tractor; means by which the vehicle frame is supported at four points, two upon each side of the tractor frame; means for raising and lowering the vehicle frame relatively to the tractor frame at each of said four points, and means for operating the raising and lowering means at said four points independently of each other.

9. In combination with a tractor, a vehicle or carriage for the same; a steering wheel mounted at the forward end of such vehicle or carriage; caster wheels mounted at the opposite sides of said carriage toward the rear end; coöperating devices on the tractor frame and on the vehicle frame by which the two frames are connected at two points in the length at each side of the tractor, and means for relatively adjusting the two frames vertically at each of said points.

10. In combination with a tractor, a vehicle for the same; connections between the tractor frame and the vehicle frame for supporting each upon the other; means for adjusting said frames relatively to each other at each end of each frame for causing either to be carried upon the other at either end; a steering wheel mounted upon the vehicle frame adapted also to act as a tractor wheel, and driving connections for said steering wheel.

11. In combination with a tractor, a vehicle for the same; connections between the tractor frame and the vehicle frame for carrying either upon the other; a steering wheel adapted also to operate as a tractor wheel mounted in one end of the vehicle frame; means for vertically adjusting the two frames relatively at the end at which the steering wheel is located for supporting the tractor frame at that end upon the vehicle frame; a motor mounted on one of said frames, and driving connections from the same to the tractor and to the steering wheel.

12. In combination with an endless belt tractor, a vehicle for the same having wheels on which it may be supported independently of the tractor, comprising a steering wheel which is adapted also to act as a tractor wheel; a motor carried by the vehicle and disengageable driving connections therefrom to the tractor and to the steering wheel, and means for engaging and disengaging said driving connections at will independently of each other.

13. In combination with an endless belt tractor, a vehicle for the same having wheels on which it may be supported independently of the tractor, said tractor being connected with the frame of the vehicle at two points on each side, said connections being adjustable to permit independent vertical adjustment of the tractor relative to the vehicle frame at each of said points of connection, one of the vehicle wheels being a steering wheel which is adapted also to act as a tractor wheel, a motor carried by the vehicle and disengageable driving connections therefrom to the tractor and to the steering wheel, and means for engaging and disengaging said driving connections at will independently of each other.

14. In combination with a tractor, comprising an endless belt adapted for driving engagement with the road surface, a supporting frame for said belt, a vehicle frame, adjustable connections between the vehicle frame and the tractor frame, a motor and driving connections therefrom to the traction belt, a combined steering and tractor wheel carried by the vehicle frame ahead of the traction belt, a caster on said vehicle frame rearward of the traction belt, and means operable at will for vertically adjusting one end of the tractor frame relatively to the vehicle frame.

15. In combination with a tractor, a carriage or vehicle for the same, the carriage having wheels for supporting it independently of the tractor and having a steering wheel, the tractor frame being mounted for lifting and lowering it independently at its front and rear ends relatively to the carriage frame; a motor mounted on the carriage frame, and separate driving connections from the motor to the tractor and to the steering wheel respectively.

16. In combination with an endless belt tractor, a self-supporting carriage or vehicle for the same, having at one end a combined steering and tractor wheel and at the other end two supporting wheels mounted for turning or swiveling about vertical axes, the tractor being mounted with its road-engaging portion intermediate between the said combined steering and tractor wheel and the swiveled wheels, and the tractor frame being mounted with capacity for vertical adjustment with respect to the vehicle frame.

17. In combination with an endless belt tractor, a self-supporting carriage or vehicle for the same having a plurality of supporting wheels all mounted for freely turning or swiveling about vertical axes.

18. In combination with an endless belt tractor, a carriage or vehicle for the same having at the middle of one end a steering wheel and at the opposite sides of the other end caster wheels.

19. In combination with an endless belt tractor, a carriage or vehicle for the same having a steering wheel toward one end and at the other end caster wheels, the tractor frame being mounted for vertical adjustment with respect to the vehicle frame, and means for so adjusting it independently at opposite sides and opposite ends.

20. In combination with an endless belt tractor, a self-supporting carriage or vehicle for the same, the tractor frame being mounted with capacity for vertical movement with respect to the vehicle frame, and means for raising and lowering it thereon, the carriage or vehicle having at one end a steering wheel and at the other end two supporting wheels mounted for freely turning or swiveling about vertical axes.

21. In combination with a tractor, comprising an endless belt adapted for engagement with the road surface and means for driving said belt, a tractor frame adapted for supporting said traction belt, an independent vehicle frame, means connecting the two frames, a plurality of wheels swivelly mounted on the vehicle frame, and means for vertically adjusting said wheels at will relatively to the road-engaging ply of the tractor belt.

22. In combination with an endless belt tractor, a carriage or vehicle for the same having wheels by which it is supported independently of the tractor swiveled on the carriage or vehicle frame for freely turning about vertical axes, the tractor being mounted for vertical adjustment with respect to the vehicle frame, and means for vertically adjusting its front and rear ends independently of each other.

23. In combination with an endless belt tractor, a vehicle or carriage for the same, a steering wheel mounted at one end of such vehicle or carriage, caster wheels mounted at the opposite sides of said carriage toward the other end, coöperating devices on the tractor frame and on the vehicle frame by which the two frames are connected at each side of the tractor, and means for relatively adjusting the two frames vertically at either side.

24. In combination with a tractor, a carriage or vehicle for the same having a frame within which the tractor is positioned; wheels on the carriage for supporting it independently; means by which the tractor is suspended from an elevated part of the carriage; means by which the carriage is suspended from an elevated part of the tractor; means for raising and lowering the tractor on the carriage, and means for raising and lowering the carriage on the tractor.

25. In combination with a tractor, a vehicle or carriage for the same having wheels for supporting it independently of the tractor; coöperating devices on the tractor frame and vehicle frame by which the two are connected at two points in the length at each side of the tractor, said devices each comprising a post erected upon the tractor frame; means for suspending the vehicle frame from an elevated point on the post, and means for operating on the suspending device for raising and lowering the vehicle frame with respect to said point of suspension.

26. In combination with a tractor, a carriage or vehicle for the same having wheels for supporting it independently of the tractor; means by which the tractor may be suspended from elevated parts of the vehicle frame; means by which the two frames are pivotally connected together at the lower part at opposite sides, and means for raising and lowering the tractor frame independently at each of its points of suspension on the carriage frame.

27. In combination with a tractor, a vehicle or carriage for the same having a plurality of wheels by which it may be supported independently of the tractor; posts erected on the tractor frame by pivotal connection therewith at their lower ends; connections by which the vehicle frame is suspended from such posts, and means for raising and lowering the vehicle frame on the posts independently at each point of suspension.

28. In combination with a tractor, a carriage or vehicle for the same having wheels for supporting it independently on the tractor; means by which the tractor frame is suspended from an elevated part of the carriage frame; upwardly-extending members on the tractor-frame pivoted thereto at their lower ends, and connections by which the carriage frame is suspended from the upper part of said upwardly-extending members; means for raising and lowering the carriage frame on the tractor frame, and means for raising and lowering the tractor frame on the carriage frame, the pivotal connection of said upwardly-extending members with the tractor frame at their lower ends being by ball-and-socket joints, and means engaging said upwardly-extending members with the carriage frame intermediate said ball-and-socket joints and the point of suspension of the carriage frame for checking relative fore-and-aft movement of said carriage frame and said members at such point of engagement.

29. In combination with a tractor, a carriage or vehicle for the same having wheels by which it may be supported independently of the tractor; means for mounting the vehicle frame on the tractor frame comprising hangers pivoted on the tractor frame for swinging fore-and-aft, and supports for the vehicle frame pivoted to said hangers below the said pivots of the latter and upstanding from their pivotal connections with said hangers respectively, and means for raising and lowering the vehicle frame on such upstanding supports.

30. In combination with a tractor, a carriage or vehicle for the same having wheels by which it may be supported independently of the tractor; means by which such vehicle frame is mounted on the tractor frame comprising hangers pivoted on the tractor frame and depending from their pivots, such hangers being jointed for swinging right and left; supports for the vehicle frame pivotally connected at their lower ends to the lower part of said jointed hangers, and means for raising and lowering the vehicle frame on said supports.

31. In combination with a tractor, a carriage or vehicle for the same having its frame mounted for raising and lowering on the tractor frame, the means connecting the two frames comprising hangers pivoted to the tractor frame for swinging fore-and-aft jointed for swinging right and left, and provided with anti-friction rollers for bearing against the tractor frame in their fore-and-aft swinging, and supports for the vehicle frame pivoted at their lower ends to the lower ends of said jointed hangers.

32. In combination with a tractor, a carriage or vehicle for the same having its frame mounted on the tractor frame, and means connecting said frames comprising hangers pivoted on the tractor frame for swinging fore-and-aft; supports for the vehicle frame pivoted at their lower ends to the depending end of the hangers, and stays connected at one end to the vehicle frame and at the other end to the tractor frame and extending fore-and-aft with inclination downward toward the front.

33. In combination with a tractor, a carriage or vehicle for the same having its frame mounted upon the tractor frame; connections between said frames comprising hangers pivoted on the tractor frame and depending from their pivots; supports for the vehicle frame pivotally connected at their lower ends to the lower ends of the hangers, and stay chains extending obliquely in vertical fore-and-aft planes crossing each other, connected at their upper ends to one of said frames and at their lower ends to the other frame.

34. In combination with a tractor, a carriage or vehicle for the same having wheels for supporting it independently of the tractor; posts erected on the tractor frame; flexible connections by which the tractor is suspended at two points in its length from an elevated part of the carriage frame; flexible connections by which the carriage frame is suspended at two points of its length from the upper ends of the posts, and means for operating on said flexible connections independently of each other for raising and lowering the tractor frame and carriage frame relatively to each other.

35. In combination with a tractor, a carriage or vehicle for the same having wheels for supporting it independently of the tractor; vertically-extending members on the tractor frame and vehicle frame respectively engaged with each other for relative up-and-down-movement and for preventing relative fore-and-aft movement; springs interposed in the one of such engaged members for cushioning the frame which is carried on the other frame, and means for raising the carriage frame on the tractor frame.

36. In combination with a tractor, a carriage or vehicle for the same, said tractor and vehicle having their frames connected for relative vertical adjustment, said connections comprising vertical members rigid with the vehicle frame, and spring-supported posts on the tractor frame telescoping with such rigid vertical members.

37. In combination with a tractor, a vehicle for the same comprising a rigid frame having vertical members; sleeves pivoted on the tractor frame with which said vertical members of the vehicle frame are engaged for vertical movement therein; bars guided on said vertical members; springs interposed between the lower ends of said bars and said sleeves, and connections by which the vehicle frame is suspended from elevated points on said bars.

38. In combination with a tractor, a carriage or vehicle for the same; means connecting the frame of the carriage and the frame of the tractor at two points in the length on each side of said frames, consisting of telescoping posts comprising each a member on the tractor frame and a member on the carriage frame; means for raising and lowering the carriage frame on the tractor frame independently at each of the four points of support afforded by said telescoping posts, the members of said telescoping posts which pertain to the vehicle frame being pivoted to said frame at their lower ends, and the members which pertain to the carriage frame being rigid therewith.

39. In combination with a tractor, a carriage or vehicle for the same; means connecting the frame of the carriage and the frame of the tractor at two points in the length on each side of said frames consisting of telescoping posts comprising each a member on the tractor frame and a member on the carriage frame, and springs interposed in one of said members; means for raising and lowering the carriage frame on the tractor frame independently at each of the four points of support afforded by said telescoping posts; links suspended from the tractor frame and pivotally connected to the lower ends of the post members pertaining to said frame and constituting the means by which said post members are supported on the tractor frame.

40. In combination with a tractor, a carriage or vehicle for the same; means connecting the frame of the carriage and the frame of the tractor at two points in the length on each side of said frames consisting of telescoping posts comprising each a member on the tractor frame and a member on the carriage frame, and springs interposed between said members; means for raising and lowering the carriage frame on the tractor frame independently at each of the four points of support afforded by said telescoping posts; links suspended from the tractor frame and having a universal joint connection to the lower ends of the post members pertaining to said frame and constituting the means by which said post members are supported on the tractor frame.

41. In combination with a tractor, a carriage or vehicle for the same, the tractor and vehicle having their frames connected for relative vertical adjustment to cause either frame to be carried upon the other, said means comprising posts erected upon the tractor frame consisting each of two sleeves, one above the other, a spring interposed between them, the lower sleeve being secured to the tractor frame, an upper member of the post being secured to the upper sleeve, and rigid members of the vehicle frame telescoping with said sleeves and embracing said upper post member.

In testimony whereof, I have hereunto set my hand at Chicago, Illinois, this 27th day of January, 1910.

WILLIAM P. ALLEN.

Witnesses:
   CHAS. S. BURTON,
   M. GERTRUDE ADY.